Aug. 17, 1937.   R. H. MARCHANT   2,089,977
FAUCET
Filed April 11, 1931
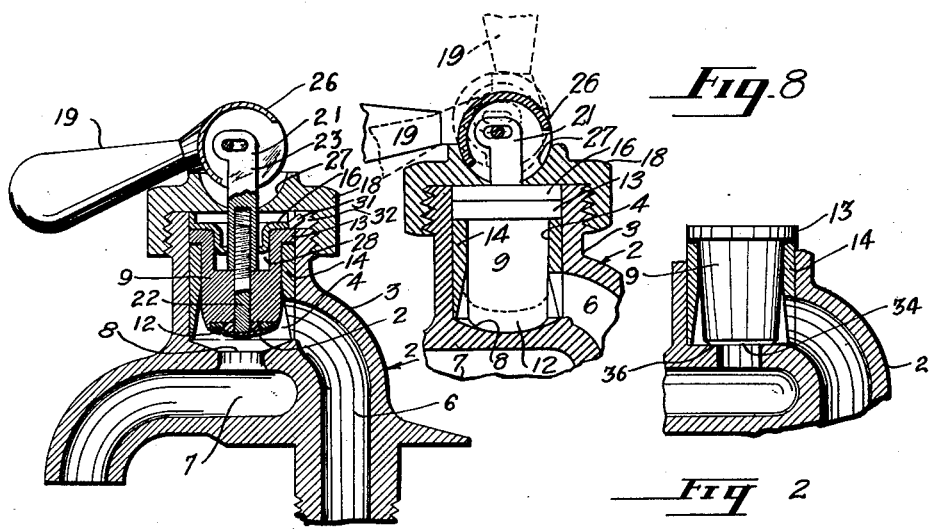
Fig. 8
Fig. 1
Fig. 2
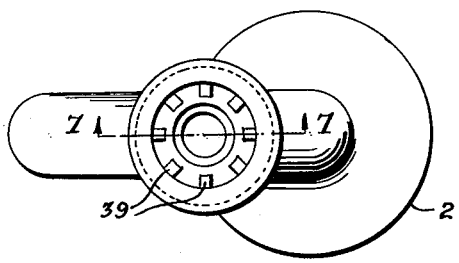
Fig. 3
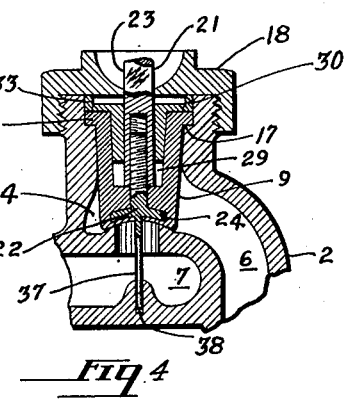
Fig. 4
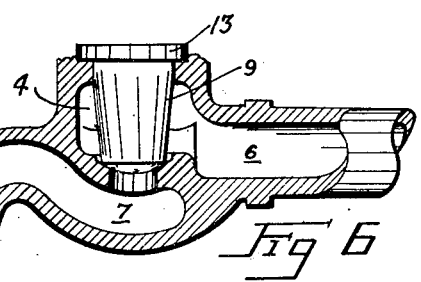
Fig. 6
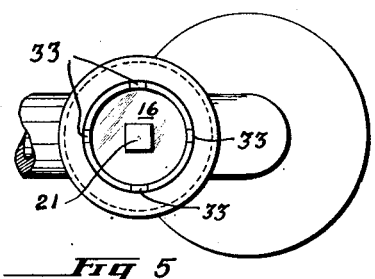
Fig. 5
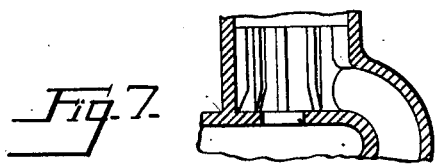
Fig. 7
INVENTOR.
Rodney H. Marchant
BY Joseph B. Gardner
ATTORNEYS.

Patented Aug. 17, 1937

2,089,977

UNITED STATES PATENT OFFICE 2,089,977

FAUCET

Rodney H. Marchant, Oakland, Calif., assignor, by mesne assignments, to Marchant Valve Corporation, a corporation Application April 11, 1931, Serial No. 529,466

8 Claims. (Cl. 251—24)

The invention relates to a faucet and particularly to the type wherein the valve functions not only to control the flow of liquid through the faucet but to seal, without the aid of a packing gland, the opening through which the valve spindle projects from the faucet body.

An object of the invention is to provide a faucet of the character described in which the valve, although having a yielding body and mounting, and subject to liquid pressures causing a distortion and derangement of the body from its normal form and position, will be effectively guided to and from engagement with the valve seat without impairing the free and easy operation of the valve or the efficiency of the faucet.

Another object of the invention is to provide a faucet with the above mentioned advantages, which may be readily assembled or taken apart, and has its parts so designed and arranged to operate, that the faucet will last indefinitely under all conditions of use.

A further object of the invention is to provide a valve of the character described which will eliminate any possibility of water hammer.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal sectional view of a faucet constructed in accordance with my invention, the valve of the faucet being shown in open position.

Figure 2 is a fragmentary section similar to Figure 1, but showing the valve in closed position and with a slightly modified form of the cooperating valve and seat portions.

Figure 3 is a plan view of a modified faucet body.

Figure 4 is a fragmentary longitudinal sectional view of a further modified form of the faucet.

Figure 5 is a plan view of the faucet as shown in Figure 4, but with one of the parts removed.

Figure 6 is a fragmentary longitudinal section of a faucet of still further modified form.

Figure 7 is a fragmentary section view taken substantially on the plane of line 7—7 of Figure 3.

Figure 8 is a view similar to Figure 1, but with the valve of the faucet shown in closed position.

As illustrated in Figures 1 and 8 of the drawing, the faucet 2 comprises a body 3 having an open topped valve chamber 4 into which extends an inlet passage 6 and from which extends a discharge passage 7. The passage 6 opens into the chamber at the lower portion thereof, and the passage 7 has its inner extremity at the bottom of the chamber, which bottom is formed to provide a valve seat 8.

Arranged in the chamber 4, with its upper portion anchored therein, is a valve 9 formed of a resilient material such as rubber, and arranged to have its bottom portion 12 engaged with or disengaged from the seat 8. The valve is provided at its upper end with an outwardly extending annular flange 13 which is arranged to be clamped between opposing parts near the top of the chamber so as to securely anchor the valve in the body. Where, as in Figures 1 and 2, the side walls of the chamber are defined by a bushing 14, the flange 13 is arranged to be clamped between the top face of the bushing and a retaining plate 16 positioned thereover. On the other hand, where the bushing is omitted, as in Figures 4 and 6, the flange is clamped between the retaining plate and the upper face of an inwardly-extending valve-supporting portion 17 formed integral with the body and defined in the chamber near the top thereof. The retaining plate in each of the instances described is removably held in position by a cap 18 which has a screw threaded engagement with the faucet body.

The valve 9 is normally of such length that when anchored as aforesaid the bottom thereof will forcibly engage the valve seat 8 and thus effect a stoppage of the flow of liquid through the faucet. To bring about the opening of the passage the valve must be contracted, and thus it will be seen that in both the closed and open positions the valve is in a compressed state. Manipulation of the valve to allow decreased compression or to cause an increased compression as aforesaid, is here shown arranged to be effected through means of a lever handle 19 designed to fulcrum on the cap 18 and pivotally connected to the valve stem 21. The latter is preferably formed in two sections 22 and 23 which are connected by threaded engagement so as to permit longitudinal adjustment therebetween. The stem section 22 is embedded in the valve body and is provided at its lower extremity with a head portion 24 which conforms in shape to the bottom of the valve and is at least equal in width to the opening of the discharge passage leading from the chamber. It is to be noted that the thickness of the material of the valve covering the bottom and side edges of the head is a minimum and amounts to little more than a film. In this manner the bottom of the valve will have a natural frequency of vibration at least as great as the natural frequency of vibration of the liquid in the outlet passage, and as a result thereof no "water hammer" will be caused upon the "cracking" of the valve. Preferably, in order to obtain a firm hold between the head and the valve portion surrounding same, the head is formed with a number of perforations whereby the valve material may extend through as well as about the head.

Compression of the valve to raise the bottom thereof from the seat may be effected by depressing the lever 19 so that the stem will be drawn upwardly, as clearly shown in Figure 1. As will also be clear from said view and from Figure 8, the lever 19 is formed with a ball portion 26 arranged to bear in a socket 27 in the cap, and the portion 26 has an eccentric or offset connection with the stem whereby upon elevation of the handle, as shown dotted in Figure 8, the ball portion 26 will be rotated in the socket 27 to thereby raise the stem. It will be noted that in the latter operation the handle will automatically remain in any set position and thereby permit the continuous flow of liquid in any desired amount.

In order that there may be permitted both the unrestricted transverse distention of the valve and the ready flow of the liquid around the valve in its passage through the chamber when the valve is compressed to uncover the seat, a space is required between the lower portion of the valve and the side walls of the chamber. While it is thus seen that advantage is had in spacing the lower portion of the valve from the chamber walls, it is on the other hand desirable to have the upper portion of the valve supported against such walls so that upon the compressive and releasing movements of the valve a minimum strain will be imposed on the portion of the valve clamped against movement. To provide for the foregoing, at least two possibilities in design are available, one of which as most clearly illustrated in Figure 6 comprises in tapering or otherwise forming the sides of the valve whereby the upper portion will be wider than the lower, and the other lies in forming the chamber as shown in Figures 1 and 4, with downwardly diverging or other equivalent side walls affording the same benefit.

Owing to the provision of the space around the lower portion of the valve as aforesaid, and by reason of the yielding nature of the material comprising the valve, the lower portion of the valve will tend to flatten against the chamber wall portion opposite the inlet opening when the liquid is being forced through the faucet under considerable pressure. Furthermore, owing to the desirability of allowing a free movement of the stem, the mounting is preferably such as permits of a certain amount of transverse displacement of the valve particularly at the seating end thereof. It will thus be seen that when the valve is in open position, two factors contribute to throw the bottom portion of the valve out of alignment with the seat. Such derangement and deformation of the valve become an important consideration where the finished valve seat is of relatively narrow width, as is the case in the embodiment shown in Figure 6 where the seat must be reamed by a tool insertable through the relatively small open end of the chamber. With the width of the seat thus restricted, the tapered feature of the valve becomes of further importance since the seating surface of the latter is thus sufficiently restricted in width that it cannot, in spite of the deflection of the valve, lodge on the rim of the seat and prevent the full closing of the discharge opening. Where, as in Figure 1, it has been possible by reason of the use of the bushing, to make the valve seat of considerably greater width than the width of the portion of the chamber engaging the upper portion of the valve, the necessity of using a tapered valve on account of the deflection, is dispensed with, since in such case the seating surface of the valve cannot be displaced beyond the seat.

As an additional aid in guiding the stem and supporting the flanged portion of the valve in clamped position, the retaining plate 16 is extended into the hollow portion 28 of the valve, and, as shown in Figure 4, the depending portion 29 of the plate 30 provides a long, full bearing for the stem and a support and guide for the valve along substantially the entire length of the plate. It will be understood that the engagement of the plate with the stem is such as to prevent rotation of the engaged parts relative to each other. Rotation of the plate relative to the faucet body may be prevented, as shown in Figure 1, by engagement of a tongue 31 on the plate with a recess 32 at the top of the body, or as is shown in Figure 4, the rim of the plate may be in the form of outwardly pressed spring-like segments 33 which frictionally engage the body.

In Figure 2 the seat engaging portion 34 of the valve, as well as the seat 36, is formed flat thereby providing a simplified but possibly not as efficient a design as that illustrated in Figure 1. A further modification of the valve and seat is shown in Figure 4 where said members are respectively formed concave and convex. In the latter figure is also illustrated a supplemented means for guiding the valve in its movement to and from its seat, said means comprising a depending stem 37 passing through the liquid discharge opening and slidably engaging in a bore 38 formed in the faucet body. In Figures 3 and 7 a supplemental means for guiding the valve is shown in the form of bearing ribs 39 extending inwardly from the chamber walls and arranged to engage the sides of the valve.

I claim:

1. In a faucet, a body having an open-topped chamber with a valve seat at the bottom thereof, a hollow plug of resilient material open at the top and arranged to engage said seat, a retaining member fitted into the top of the plug and held in the top of said chamber against rotation relative to the body and arranged for clamping the upper portion of said plug against movement in the body, and a stem connected to said plug wherewith the same may be compressed or extended for disengagement from or engagement with said seat and being engaged by said member for guiding the plug in its movement to and from said seat and for preventing the relative rotation of the portion of the stem engaged with the member.

2. In a faucet, a body having a passageway therethrough and a valve seat associated with said passageway, a rubber valve plug normally engaging at one end thereof with said seat and arranged to be contracted for effecting disengagement from the seat, said plug being secured at its other end to said body and having its side portions adjacent such end arranged to engage the body so as to support the plug in its contracting and expanding movements, an actuating member for contracting said plug, means connecting said member and plug, said member when moved in one direction being pivotally supported on the faucet casing intermediate its length to effect a contraction of said plug and to permit an automatic expansion of same on release of said member, said member having cam means adapted to be frictionally held in engagement with said faucet body and operative on movement of said member in another direction to contract said plug and retain the same in contracted position on release of said member.

3. In a faucet, a body having an open topped chamber with a valve seat at the bottom thereof, a valve plug of resilient material arranged to engage said seat and affixed in said chamber near the top of the plug, said plug being arranged to be compressed or extended longitudinally for disengagement from or engagement with said seat, a cover for said chamber provided with a spherical socket on the exposed side thereof, a valve stem connected to said plug and extended through said cover centrally of said socket, and an actuating member having a ball shaped end normally seated in said socket and connected eccentrically to said stem to elevate the point of connection between said stem and member and compress said plug on elevation of the free end of said member, said member being arranged on depression of its free end from normal position to fulcrum intermediate its ends on said cover and thereby effect a compression of said plug.

4. In a faucet, a casing providing an open top valve chamber, a valve in said chamber operable to regulate the flow of fluid therethrough, a cap over said chamber and having a spherical seat therein, an actuating stem on said valve extending through said cap centrally of said seat, and a lever provided with a ball shaped end normally disposed on said spherical seat and connected eccentrically to said stem to elevate the point of connection between said stem and member on elevation of the free end of said lever to actuate said valve in one direction, said lever on depression of its free end from normal position adapted to be fulcrumed between its ends on said cap adjacent said seat to provide a movement of said stem and valve in the same direction.

5. A faucet comprising, a casing providing a valve chamber, a valve mounted in said chamber and movable to passage opening and passage closing positions, means connecting said valve for moving same and extending to the exterior of said casing, a lever connected to said means and disposed with an intermediate portion thereof opposed to a side of said faucet casing in the passage closing position of said valve whereby on movement of said lever to engage said intermediate portion with said side said lever may be fulcrumed about said intermediate portion to move said valve to passage opening position, the connection between said lever and said means comprising a cam on said lever arranged on movement of said lever from said first position away from said side to engage the faucet casing and effect a movement of said valve to passage opening position.

6. In combination with a faucet having a fluid flow control valve therein, valve actuating means movable from a position stopping fluid flow in two separately definable directions for permitting fluid flow, means causing on movement of said actuating means in one direction the automatic return thereof to said fluid stopping position on release thereof, and causing on movement of said actuating means in the other of said directions the retention thereof in adjusted partially or fully open position after release thereof.

7. In a faucet having an open top valve chamber and a valve therein, a cap over said chamber and having a spherical seat therein, an actuating stem on said valve extending through said cap centrally of said seat, a lever provided with a ball shaped end disposed on said spherical seat, and means connecting said stem eccentrically to said lever end and providing with said lever in horizontal position across said cap for the positioning of said valve in lowermost passage closing position in said chamber and providing on elevation of said lever for the lifting of said stem and opening of said valve, said lever when depressed being adapted to fulcrum intermediate its ends on said cap to likewise raise said stem and open said valve.

8. A faucet comprising, a body having a fluid passage, a valve therein movable from passage opening position to passage closing position and vice versa, means urging said valve to passage closing position, a stem connected to said valve and extending to the exterior of said body and effective on drawing the same in a direction outwardly from said body to move said valve from closed to open position against the resistance of said means, an operating lever having an end pivoted to said stem and having an intermediate portion of the length thereof adjacent part of said body and adapted to fulcrum on said body on movement of the free end thereof in the direction of said body to thereby withdraw said stem from said body and open said valve, and cam means on the pivoted end of said lever adapted to engage said body on movement of the free end of said lever in a direction away from said body to draw said stem from said body and open said valve, said cam means being effective to hold said lever on displacement thereof as last described in a partially or fully open position of said valve against the action of said first means.

RODNEY H. MARCHANT.